(12) United States Patent
Reynolds

(10) Patent No.: US 8,459,373 B2
(45) Date of Patent: Jun. 11, 2013

(54) MODIFIED POWER TOOL

(76) Inventor: Russell Reynolds, Tulsa, OK (US)

( * ) Notice: Subject to any disclaimer, the term of this patent is extended or adjusted under 35 U.S.C. 154(b) by 0 days.

(21) Appl. No.: 12/655,901

(22) Filed: Jan. 8, 2010

(65) Prior Publication Data

US 2011/0168419 A1    Jul. 14, 2011

(51) Int. Cl.
*E02F 9/20* (2006.01)
(52) U.S. Cl.
USPC ............................. 173/46; 173/50; 81/57.43
(58) Field of Classification Search
USPC ..................... 173/46, 50; 433/1; 451/344
See application file for complete search history.

(56) References Cited

U.S. PATENT DOCUMENTS

| | | | | |
|---|---|---|---|---|
| 1,698,952 A * | 1/1929 | Hoover | | 173/50 |
| 2,134,934 A * | 11/1938 | Wilhoit | | 15/23 |
| 2,598,895 A * | 6/1952 | Dreyer | | 464/53 |
| 2,655,689 A * | 10/1953 | Witte | | 452/101 |
| 2,790,292 A * | 4/1957 | Trecker | | 56/16.9 |
| 2,894,436 A * | 7/1959 | Eber et al. | | 396/19 |
| 2,904,804 A * | 9/1959 | Odessey | | 15/97.1 |
| 2,958,349 A | 11/1960 | McNutt | | |
| 3,270,641 A * | 9/1966 | Gosselin | | 396/138 |
| 3,447,434 A * | 6/1969 | Bougon | | 396/19 |
| 3,585,885 A * | 6/1971 | Carr | | 81/57 |
| 3,702,546 A * | 11/1972 | Schnepel | | 464/36 |
| 4,362,520 A * | 12/1982 | Perry | | 464/149 |
| 4,483,562 A * | 11/1984 | Schoolman | | 294/19.1 |
| 4,653,254 A * | 3/1987 | Qualls | | 56/16.9 |
| 5,395,188 A * | 3/1995 | Bailey et al. | | 408/127 |
| 6,155,708 A * | 12/2000 | Lindley | | 366/123 |
| 6,257,808 B1 * | 7/2001 | Groot | | 408/1 R |
| 6,354,949 B1 * | 3/2002 | Baris et al. | | 464/7 |
| 6,364,038 B1 * | 4/2002 | Driver | | 175/95 |
| 6,523,624 B1 * | 2/2003 | Cousins et al. | | 175/386 |
| 6,814,157 B2 * | 11/2004 | Maras | | 173/171 |
| 6,862,958 B2 * | 3/2005 | Schade | | 81/177.6 |
| 7,238,021 B1 * | 7/2007 | Johnson | | 433/1 |
| 7,326,215 B2 | 2/2008 | Myers et al. | | |
| 2005/0271489 A1 * | 12/2005 | Gensmann et al. | | 409/231 |
| 2007/0053754 A1 * | 3/2007 | Hartranft et al. | | 408/127 |
| 2007/0161344 A1 * | 7/2007 | Clayton et al. | | 451/456 |

\* cited by examiner

*Primary Examiner* — M. Alexandra Elve
*Assistant Examiner* — Nathaniel Chukwurah
(74) *Attorney, Agent, or Firm* — John M. Behles

(57) ABSTRACT

A modified power tool which includes a housing, a motive source disposed at least partially within the housing, a rigid and curved extension extending from the housing, a flexible shaft extending through the extension, and a connector assembly which includes a shaft and a connector extending from the shaft.

9 Claims, 5 Drawing Sheets

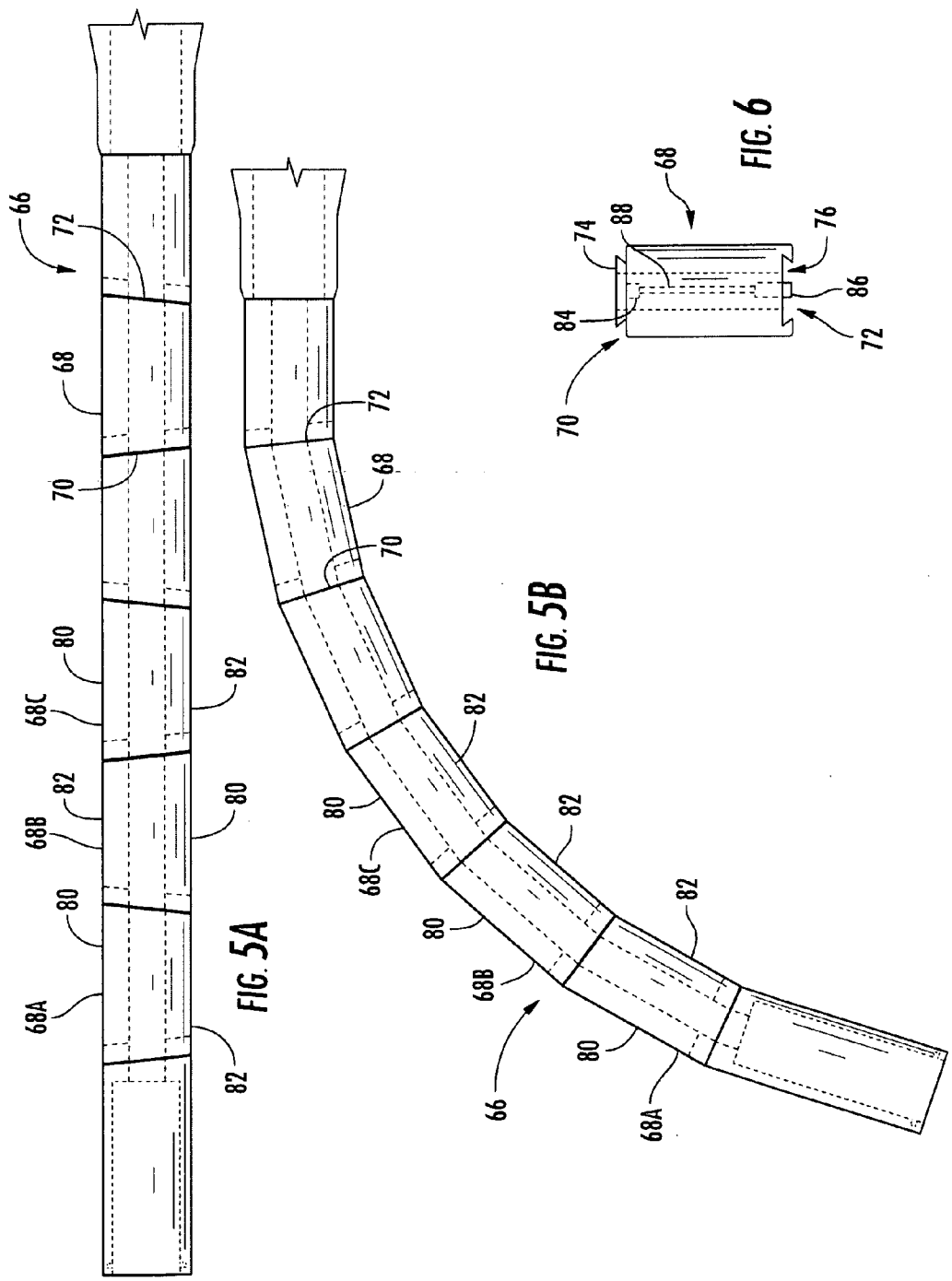

MODIFIED POWER TOOL

CROSS-REFERENCE TO RELATED APPLICATION(S)

Not Applicable

BACKGROUND OF THE INVENTION

1. Field of the Invention

The present invention relates in general to a modified power tool and more particularly, but not by way of limitation, to a power tool having a rigid and curved extension.

2. Background Art

Power tools and attachments for power tools have been known in the art for years and are the subject of numerous patents, including: U.S. Pat. No. 7,326,215 entitled "Curved surgical tool driver," U.S. Pat. No. 6,257,808 entitled "Wall fishing apparatus," U.S. Pat. No. 5,395,188 entitled "Guide for angled and curved drilling," and U.S. Pat. No. 2,958,349 entitled "Curved extension drill"—all of which are hereby incorporated herein by reference in their entirety including the references cited therein.

U.S. Pat. No. 7,326,215 appears to disclose a surgical tool driver that has a driven end connectable to a rotary drive source and a driving end connectable to a surgical tool. A shaft assembly there between includes a hollow outer shaft and a flexible drive shaft for transmitting rotary power from the driven end to the driving end. The shaft assembly is curved for bypassing anatomical features in a patient.

U.S. Pat. No. 6,257,808 appears to disclose a wall fishing apparatus having a flexible guide tube with prongs or other work-engaging means at one end. The prongs may be stabbed into an obstruction in a hollow wall to set the position of a throughhole and to hold the tubular guide in a fixed position against the torsional, or other, forces of a drill or other cutting tool used to cut the hole. The drill may be rotated by means of a flexible shaft running within the guide tube.

U.S. Pat. No. 5,395,188 appears to disclose a drilling tool for drilling a curved hole. The tool includes a curved guide tube for positioning the tube in drilling position against a wall and a flexible shaft extending through the guide tube having a drill bit on the end thereof adjacent the outlet end of the tube and a shank on the opposite end engaged in a drill tool chuck. Operation of the drill tool rotates the drill bit and the tube guides and directs the bit to drill a curved or angled hole. The drill bit can be a spade bit, a spiral bit or a ball mill.

U.S. Pat. No. 2,958,349 appears to disclose boring devices and has reference to a curved extension drill for boring holes in otherwise inaccessible places, such as in plates between inner and outer wall surfaces when installing electrical wiring or plumbing.

While the above-identified patents do appear to provide power tools and/or attachments for power tools, their configurations remain non-desirous and/or problematic inasmuch as, among other things, none of the above-identified attachments disclose a modified power tool that includes a rigid and curved extension.

It is therefore an object of the present invention to provide a modified power tool, which, among other things, remedies the aforementioned detriments and/or complications associated with the use of the above-identified, conventional attachments and/or power tooling.

These and other objects of the present invention will become apparent in light of the present specification, claims, and drawings.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 5A of the drawings is a side elevation view of a segmented extension in a substantially linear configuration;

FIG. 5B of the drawings is a side elevation view of the segmented extension of FIG. 5A in a substantially curvilinear configuration; and FIG. 6 of the drawings is a top plan view of a segment of the segmented extension of FIGS. 5A and 5B.

DETAILED DESCRIPTION OF THE INVENTION

Figure 1:
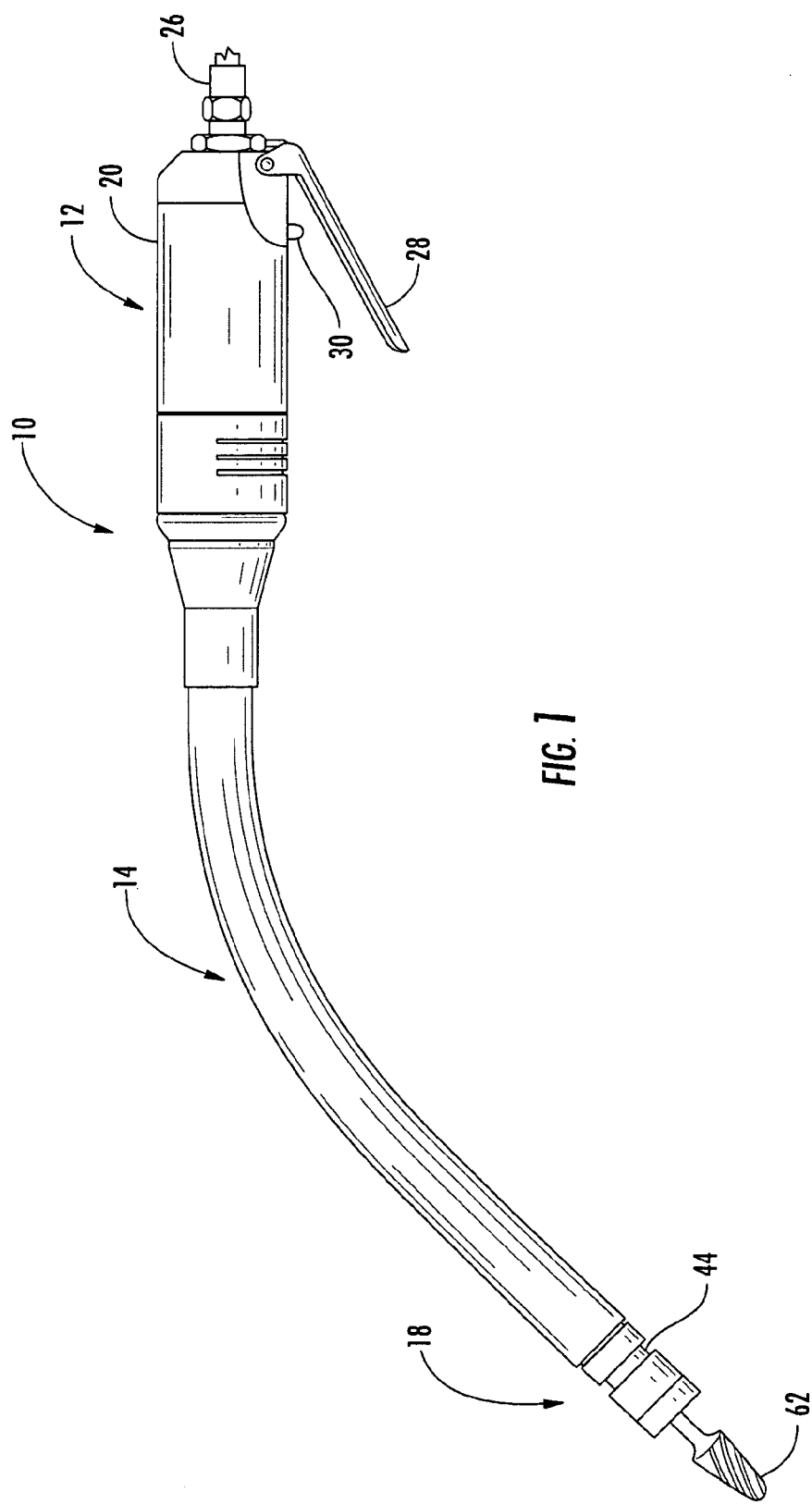
FIG. 1 of the drawings is a perspective view of a power tool, constructed in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Figure 2:
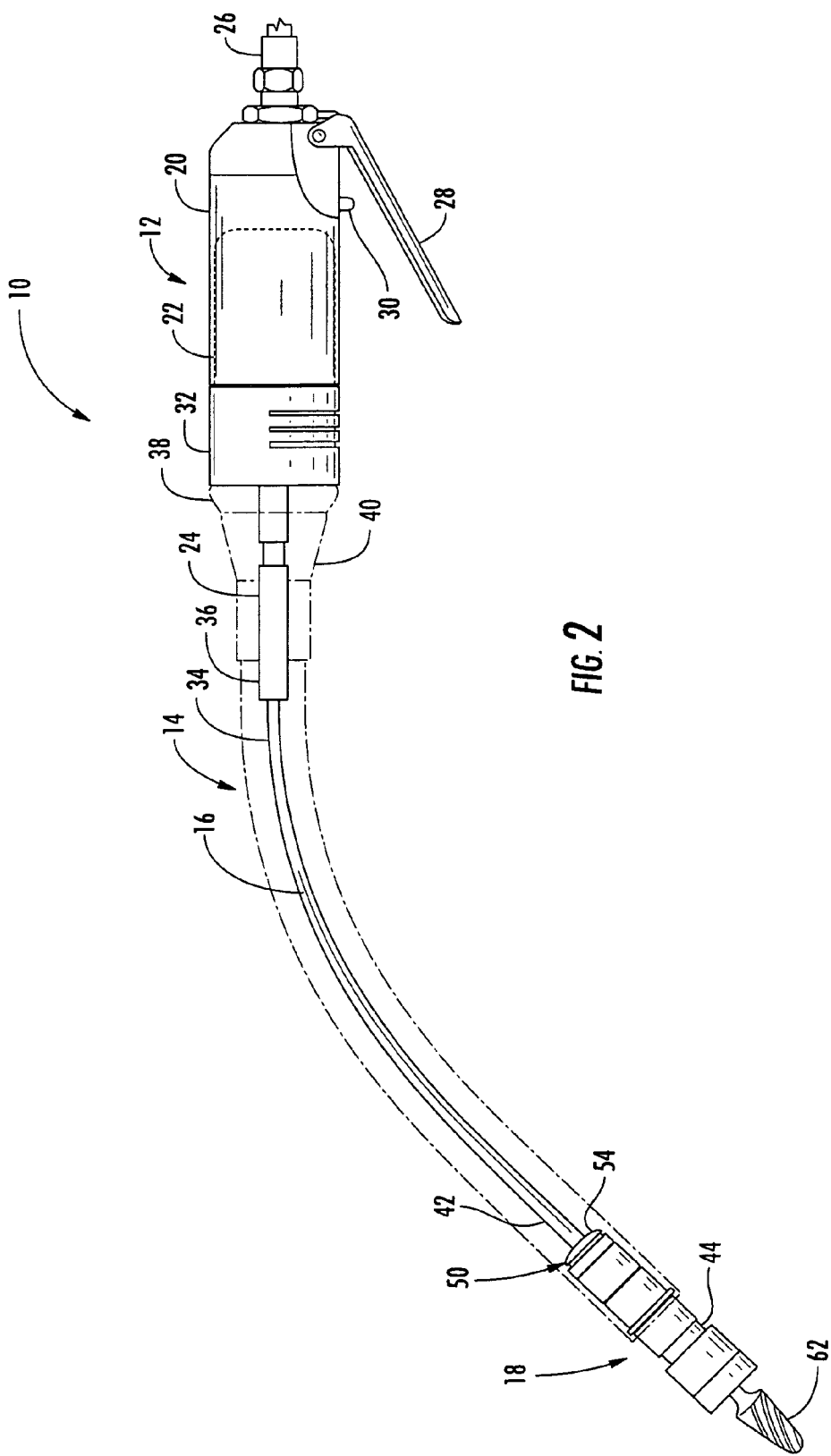
FIG. 2 of the drawings is a partial perspective view of the power tool of FIG. 1, showing an extension in cross-section.

Referring now to the drawings, and more particularly to FIGS. 1 and 2 collectively, shown therein is power tool 10. Power tool 10 is shown as generally comprising die grinder assembly 12, rigid and curved extension, hereinafter referred to as extension 14, flexible shaft 16, and collet assembly 18. It will be understood that extension 14 may be adapted to connect to various types of power tools 10. For the purposes of brevity, only power tool 10 (e.g., pneumatic die grinder) illustrated in FIGS. 1-6 will be discussed in detail.

Die grinder assembly 12 preferably includes housing 20 that encloses motive source 22 such as an air motor for rotating output shaft 24. In one embodiment, die grinder assembly 12 includes port 26 for interfacing with an air supply hose of a compressor (not shown). Air communicated from the compressor via the air supply hose drives the air motor and in turn rotates output shaft 24. Die grinder assembly 12 also comprises actuator 28 for controlling the operation of die grinder assembly 12. When actuator 28 is depressed, it contacts button 30 allowing air to flow from the air supply hose through port 26 to operate motive source 22. Die grinder assembly 12 may also include collar 32 for joining die grinder assembly 12 to extension 14 as will be discussed below. As the construction and operation of pneumatic power tools is well known in the art, specific details regarding of the operation functionality of various parts of die grinder assembly 12 will not be addressed in any further detail.

It will be understood that output shaft 24 is preferably constructed to receive and retain first end 34 of flexible shaft 16. In one embodiment, output shaft 24 includes end 36 is sized to receive and retain first end 34 of flexible shaft 16. In one embodiment, end 36 is substantially square in shape and first end 34 of flexible shaft 16 is substantially square shaped and sized to fit within end 36. Although both first end 34 of flexible shaft 16 and end 36 of output shaft 24 have been disclosed as having substantially square shapes, one of ordinary skill in the art will appreciate that many other shapes or methods (e.g., welding, crimping, etc.) for joining flexible shaft 16 to output shaft 24 could be utilized in accordance with the present invention.

In one embodiment, extension 14 is preferably a rigid and curved tubular member having threaded collar 38 and conical transition 40 transitioning to an elongated body portion. Extension 14 is preferably fabricated from a strong and rigid material such as a metal, metallic alloy, plastic, resin, composite, and the like. Extension 14 is sized to enclose and permit flexible shaft 16 to rotate therein. Extension 14 is provided to increase the operative length of power tool 10 and to allow power tool 10 to be utilized for applications where traditional power tools are unsuitable (e.g., curved workpieces). Although power tool 10 may be utilized for virtually any pertinent application, power tool 10 having extension 14 is useful in certain locations, for example, within aircraft engine parts (e.g., turbo charger housings), wings, or fuselages.

Threaded collar 38 of extension 14 is constructed to interface with collar 32 of die grinder assembly 12 to releaseably secure extension 14 to die grinder assembly 12. It will be understood that the relatively larger diameter of threaded collar 38 interfacing with collar 32 provides a robust connection of extension 14 to die grinder assembly 12. Therefore, a relatively large amount of force may be applied to an accessory attached to extension 14 in contrast to a typical attachment utilized with standard power tools which only connects to the power tool via a small shaft inserted into the chuck of the standard power tool. Large forces applied to standard attachments can result in failure at the connection point between the attachment and the power tool.

It will be understood that extension 14 may have any number of shapes and/or lengths depending on the particular application for power tool 10. That is, the shape of the curvature of extension 14 may depend in part upon the shape of the workpiece (not shown). For example, the act of grinding within a turbo fan housing may require extension 14 having a greater degree of curvature than grinding within a vehicle exhaust pipe which is substantially straight. Therefore, the shape of extension 14 may be governed by application specific requirements. Although not shown, the curvature of extension 14 may deviate from a curvature plane such that at least a portion of extension 14 is helical.

Flexible shaft 16 extending between die grinder assembly 12 and collet assembly 18 may include any number of commonly utilized flexible shafts that would be known to one of ordinary skill in the art with the present disclosure before them. As stated previously, flexible shaft 16 includes first end 34 and second end 42. Flexible shaft 16 is provided to transfer rotational forces from output shaft 24 of die grinder assembly 12 to collet assembly 18. Second end 42 of flexible shaft 16 is fabricated to interface with collet assembly 18 as will be discussed in greater detail below.

Figure 3:
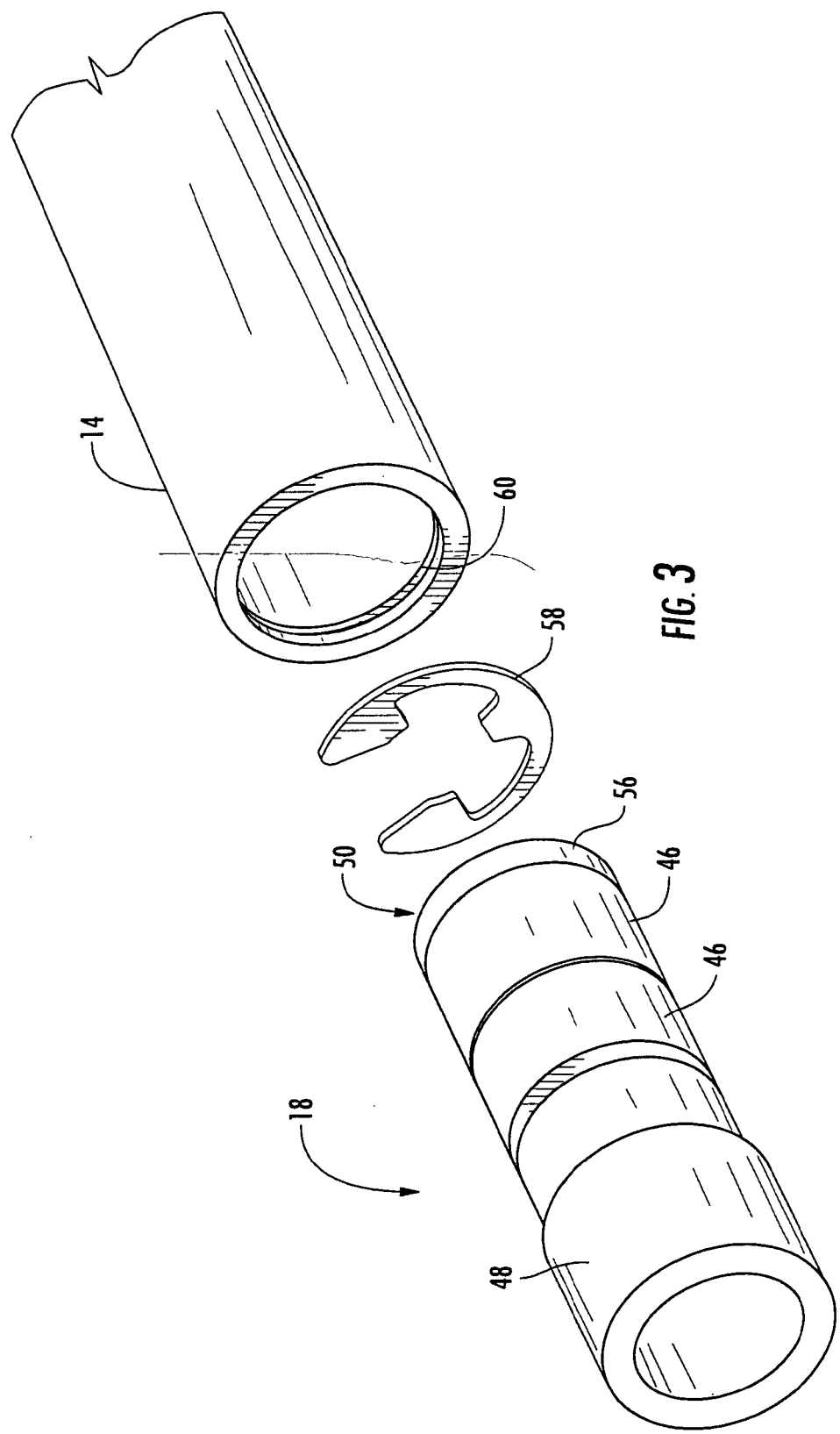
FIG. 3 of the drawings is an exploded view of a collet assembly and an end of the extension.

Referring now to FIG. 3, collet assembly 18, also known as a connector assembly, is shown as generally comprising shaft 44 (see FIG. 1), one or more bearings 46, and collet 48. Shaft 44 is provided with end 50 fabricated to receive and retain second end 42 of flexible shaft 16. In one embodiment, shaft 44 is provided with a substantially square shaped slot (not shown) which is sized to receive and retain second end 42 of flexible shaft 16 which is substantially square in shape.

Bearings 46 are sized to be slidably received over shaft 44. In one embodiment, collet assembly 18 includes two bearings 46. It will be understood that the utilization of two or more bearings 46 reduces eccentric rotation of shaft 44 of collet assembly 18 which can lead to damage of collet assembly 18 and/or extension 14.

Collet assembly 18 may include retaining clip 54 (see FIG. 2) and bushing 56 for retaining bearings 46 on shaft 44. Additionally, collet assembly 18 may also include second clip 58 for rotatably supporting collet assembly 18 on a terminal end of extension 14. In one embodiment, second clip 58 is provided for interfacing with groove 60 fabricated into the inner surface of extension 14. When second clip 58 is inserted into groove 60 of extension 14, second clip 58 releaseably secures collet assembly 18 to extension 14.

Collet 48 is shown disposed on the end of shaft 44 opposite end 50. Collet 48 is provided to releaseably receive and retain accessory 62 (see FIG. 1) such as a grinder, sanding pad, drill bit, drive shaft, or the like. It will be understood that other connectors for joining accessories, for example, a chuck, which would be known to one of ordinary skill in the art are also likewise contemplated for use in accordance with the present invention.

Figure 4:
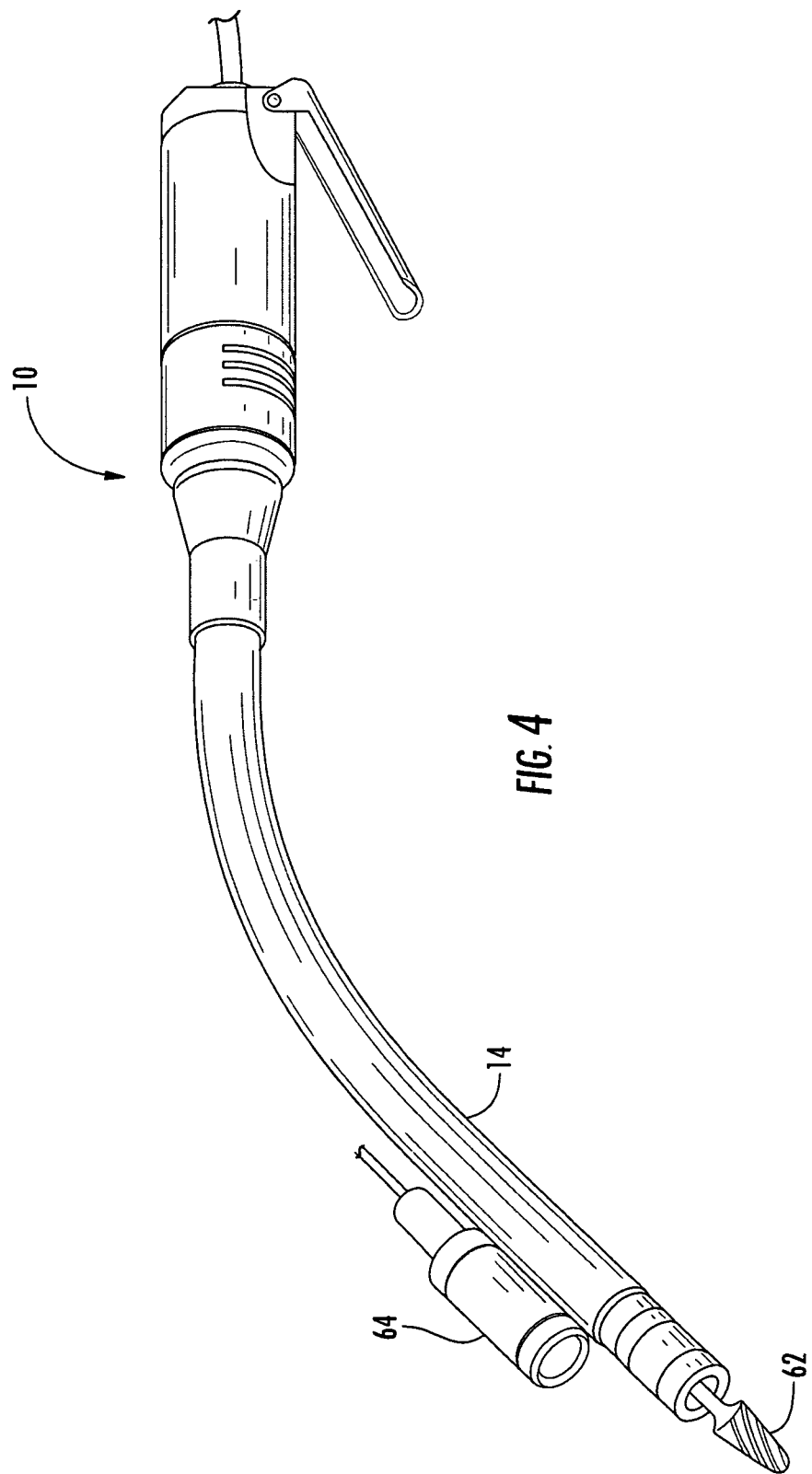
FIG. 4 of the drawings is a partial perspective view of the power tool having a borehole camera connected thereto.

Referring now to FIG. 4, it will be understood that because the curved shape of extension 14 can position accessory 62 in locations inaccessible to typical power tools, for example, locations out of the visual field of the operator, power tool 10 may include an optical device such as borehole camera 64. Borehole camera 64 may be releaseably or securely connected to power tool 10 proximate accessory 62 to provide remote visual surveillance of accessory 62.

Borehole camera 64 can assist an operator in making various types of operational adjustments, for example, changes in the location of accessory 62 or the speed of rotation of accessory 62. While an optical device such as borehole camera 64 has been disclosed, one of ordinary skill in the art will appreciate that many other types of optical devices such as cameras, mirrors, reflectors, and the like, may likewise be utilized in accordance with the present invention. Moreover, as the installation and utilization of borehole cameras 64 and other optical devices are well known to one of ordinary skill in the art, a detailed discussion of the installation and utilization of borehole cameras or other optical devices will be omitted for the purposes of brevity.

Referring now to FIGS. 5A-6 collectively, shown therein is an alternative embodiment of power tool 10 having extension 66. In accordance with the present invention, extension 66 is shown as comprising a plurality of tubular segments, hereinafter referred to as segments 68. Each of the segments 68 includes angled ends 70 and 72 such that segments 68 have a substantially trapezoidal configuration.

In one embodiment, segments 68 include dovetail tongue 74 and groove 76 for releaseably connecting adjacent segments 68. More specifically, dovetail tongue 74 is disposed on angled end 70 and groove 76 is disposed on angled end 72. Although not shown, segments 68 may include a plurality of grooves for releaseably connecting adjacent segments 68 together in a variety of configurations depending upon how adjacent segments 68 are selectively positioned relative to one another.

It will be understood that angled ends 70 and 72 allow adjacent segments 68 to be connected together in a variety of configurations to vary the curvature of extension 66 between a substantially linear configuration (FIG. 5A) and a variety of substantially curved configurations (see FIG. 5B for one nonlimiting curved configuration) based upon the slope of the angle of angled ends 70 and 72.

For example, when segments 68 are selectively positioned in alternating fashion, for example, when long portion 80 of segments 68A and 68C are disposed upwardly and short portion 82 of segment 68B is disposed upwardly, segments 68A-68C are oriented in a substantially linear configuration.

In contrast, when segments 68 are selectively positioned uniformly, for example, when long portion 80 of segments 68A-68C are disposed upwardly, segments 68A-68C are oriented in a substantially curved configuration.

To secure adjacent segments 68 together, each segment includes threaded cavity 84, set screw 86, and passage 88. Threaded cavity 84 is disposed on angled end 70 and set screw 86 extends from the opposite end (i.e., angled end 72) with passage 88 extending between threaded cavity 84 and set screw 86. Passage 88 is designed to permit an external drive member (i.e., drill, hex key, etc.) to interface with set screw 86 such that rotation of the external drive member rotates set screw 86 to extend or retract set screw 86 from angled end 72 depending on the clockwise and/or counterclockwise rotation of the external drive member.

To lock adjacent segments 68, set screw 86 is rotated via the external drive member until the end of set screw 86 is positioned substantially flush or partially retracted into angled end 72 to allow dovetail tongue 74 of one segment 68 to be inserted into groove 76 of an adjacent segment 68. Next, set screw 86 is axially aligned with one threaded cavity 84 of the adjacent segment 68. After alignment, the external drive member rotates set screw 86 to thread set screw 86 into threaded cavity 84 of the adjacent segment 68.

Additionally, segments 68 may include one or more additional threaded cavities (not shown) for receiving set screw 86 of an adjacent segment 68 such that when adjacent segments 68 are rotated relative to one another, adjacent segments 68 can be locked together in a variety of configurations to change the angle of curvature of extension 66. Set screw 86 of one segment 68 is axially aligned with one of the one or more additional threaded cavities of an adjacent segment 68. Set screw 86 is then rotated to extend and thread set screw 86 into one of the one or more additional threaded cavities of an adjacent segment 68.

The foregoing description merely explains and illustrates the invention and the invention is not limited thereto and those skilled in the art having the disclosure before them will be able to make modifications without departing from the scope of the invention.

What is claimed and desired to be secured by Letters Patent of the United States is:

1. A power tool, comprising:
a housing;
a motive source disposed at least partially within the housing, the motive source capable of selectively rotating an output shaft;
a plurality of tubular segments connected together to form a rigid extension that extends from the housing, wherein adjacent tubular segments are connected to one another in such a way that adjacent tubular segments can be selectively positioned relative to one another to vary the curvature of the extension while remaining rigid;
a flexible shaft extending through the extension, the flexible shaft having a first end and a second end, and wherein the first end of the flexible shaft is connected to the output shaft; and
a connector assembly, wherein the connector assembly includes:
a shaft connected to the second end of the flexible shaft, the shaft being rotatably supported on a terminal end of the extension; and
a connector extending from the shaft, wherein the connector is adapted to receive an accessory.

2. The power tool of claim 1, wherein the segments include a tongue and a groove disposed on opposing ends of the segments for releaseably connecting adjacent segments together.

3. The power tool of claim 2, wherein the segments include two or more additional grooves adapted to receive the tongue of an adjacent segment for releaseably connecting adjacent segments together in a variety of configurations based upon the selective positioning of adjacent segments.

4. The power tool of claim 3, wherein the segments include one or more additional threaded cavities for receiving the set screw of an adjacent segment such that when the adjacent segments are selectively positioned relative to one another the adjacent segments can be locked together in a variety of configurations.

5. The power tool of claim 4, wherein the shaft includes two bearings slidably received on the shaft and secured onto an end of the shaft.

6. The power tool of claim 1, wherein the segments include a locking assembly for releaseably connecting adjacent segments together, wherein the locking assembly includes:
a set screw disposed on one end of the segment;
a threaded cavity disposed on an opposing end of the segment from the set screw; and
a passage extending from the set screw to the threaded cavity.

7. The power tool of claim 1, wherein the connector assembly includes a clip for rotatably supporting the connector assembly on the terminal end of the extension.

8. The power tool of claim 7, wherein the extension includes a groove fabricated along an inner surface of the extension proximate the terminal end of the extension for receiving the clip of the connector assembly.

9. The power tool of claim 1, wherein the extension further includes an optical device disposed proximate the terminal end of the extension.

\* \* \* \* \*